T. G. JOHNSON.
MOP.
APPLICATION FILED MAY 14, 1913.

1,162,723.

Patented Nov. 30, 1915.

WITNESSES:
D. E. Hamilton
L. J. Fischer

INVENTOR:
Theodore G. Johnson,
BY
F. G. Fischer,
ATTORNEY.

UNITED STATES PATENT OFFICE.

THEODORE G. JOHNSON, OF KANSAS CITY, MISSOURI.

MOP.

1,162,723. Specification of Letters Patent. Patented Nov. 30, 1915.

Application filed May 14, 1913. Serial No. 767,583.

*To all whom it may concern:*

Be it known that I, THEODORE G. JOHNSON, a citizen of the United States, residing at Kansas City, in the county of Jackson and State of Missouri, have invented certain new and useful Improvements in Mops, of which the following is a specification.

My invention relates to improvements in mops, and more especially to mop heads.

The device is so constructed that it can be readily inserted into corners and beneath furniture while either mopping or applying oil or stain to a floor.

Figure 1:
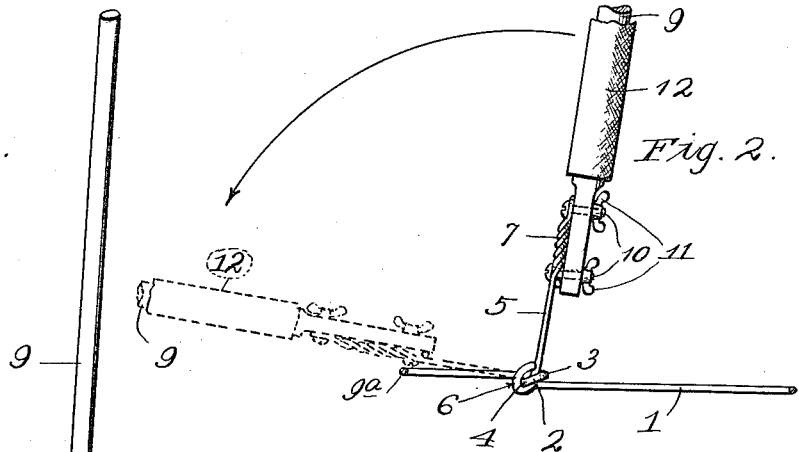
Figure 3:
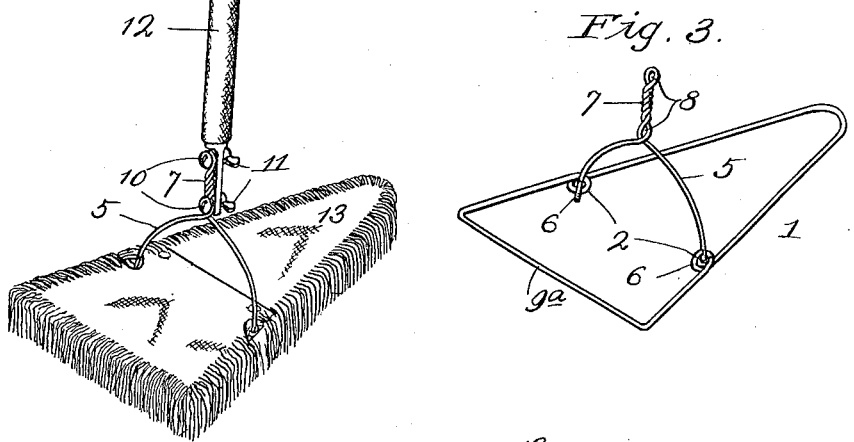
Figure 4:
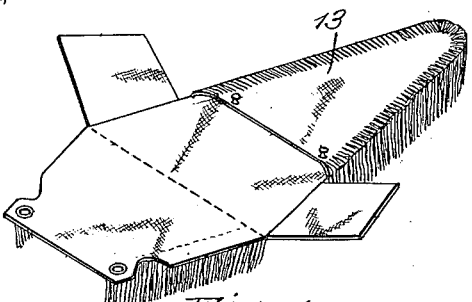

In order that the invention may be fully understood, reference will now be made to the accompanying drawing, in which:

Figure 1 is a perspective of a complete mop. Fig. 2 is a side elevation of the mop with the upper portion of the handle broken away, and showing the operation of said handle in dotted lines. Fig. 3 is a detail perspective of the mop-head and a bail loosely connected thereto. Fig. 4 is a detail perspective of a removable cover for the mop-head.

In carrying out the invention, I employ a mop-head 1, consisting, preferably, of one piece of wire bent in triangular form, so that it may be readily inserted into corners when dusting, or mopping, or applying stain or oil to a floor, or furniture. The longitudinal sides of the mop-head 1 have loops 2, the forward sides 3 of which are raised above the rear sides 4, for a purpose which will hereinafter appear.

5 designates a bail formed, preferably, from one piece of wire the lower ends of which have loops 6 loosely embracing the rear sides 4 of loops 2. The upper end of the bail is twisted to form a rigid shank 7 having eyes 8 therein.

9 designates a handle the lower end of which is secured upon shank 7 by a pair of bolts 10 and thumb-nuts 11, the bolts 7 passing through the eyes 8 and registering openings in the handle. The lower portion of handle 9 is incased in a tubular cushion 12, which prevents the hard material forming the handle from contacting and marring chairs and other furniture when mopping beneath the same.

13 designates a cover for the mop head 1. As shown on Figs. 2 and 3, loops 2 are arranged in advance of the rear end of the mop-head. Hence, when downward pressure is applied through the handle 9, said pressure is distributed in a substantially uniform manner over the entire surface of the mop-head, instead of merely at the rear end thereof as would be the case if the handle were attached to the rear end of the mop-head. By arranging the front sides 3 of loops 2 higher than the rear sides 4 thereof, the handle 9 may be swung downward and backward to almost a horizontal position, as shown by dotted lines, Fig. 2, which permits it to be readily inserted beneath chairs and furniture. This arrangement of the loops 2 also causes the front sides 3 thereof to act as a stop in limiting the upward movement of the handle, the latter being allowed to swing only a slight distance beyond a vertical plane before the sides of the bail contact the two front sides 3 of the loops 2. When the handle 9 is swung upward to the position shown on Figs. 1 and 2, it will stand alone, which is quite an advantage when occasion arises to temporarily let go of the handle.

Having thus described my invention, what I claim and desire to secure by Letters Patent is:

1. A device of the character described, consisting of a mop-head having two oppositely-disposed loops the forward sides of which are higher than the rear sides, a bail having loops at its lower ends loosely-embracing the lower portions of the loops on said mop-head, said bail being adapted to contact the front sides of the mop-head loops and be limited in its forward movement thereby, and a handle secured to said bail.

2. A device of the character described, comprising a wire frame provided at its side portions with inclined loops to form connecting eyes, and a handle operably-connected to the lower parts of said loops, the higher parts of the loops serving to support the handle in substantially a vertical position.

In testimony whereof I affix my signature, in the presence of two witnesses.

THEODORE G. JOHNSON.

Witnesses:
 F. G. FISCHER,
 L. J. FISCHER.